United States Patent [19]

Seo et al.

[11] Patent Number: 5,799,419
[45] Date of Patent: Sep. 1, 1998

[54] METHOD FOR CONTROLLING THE OPERATION OF POWER EXCAVATOR

[75] Inventors: Jeong Yong Seo; Myung Hoon Song, both of Changwon, Rep. of Korea

[73] Assignee: Samsung Heavy Industries Co., Ltd., Kyung Nam, Rep. of Korea

[21] Appl. No.: 742,650

[22] Filed: Nov. 1, 1996

[30] Foreign Application Priority Data

Oct. 31, 1995 [KR] Rep. of Korea ............... 95 38599

[51] Int. Cl.⁶ ............................................. E02F 3/43
[52] U.S. Cl. ..................... 37/348; 37/414; 364/424.07
[58] Field of Search ............................. 37/348, 414, 443, 37/382; 172/4, 4.5, 7; 414/698, 699, 700; 364/424.07, 167.01

[56] References Cited

U.S. PATENT DOCUMENTS

| | | | |
|---|---|---|---|
| 5,065,326 | 11/1991 | Sahm | 364/424.07 |
| 5,446,980 | 9/1995 | Rocke | 37/348 |
| 5,490,081 | 2/1996 | Kuromoto et al. | 37/414 X |
| 5,493,798 | 2/1996 | Rouke et al. | 37/348 |
| 5,598,648 | 2/1997 | Moriya et al. | 37/348 |
| 5,627,467 | 5/1997 | Lee et al. | 37/413 X |

FOREIGN PATENT DOCUMENTS

94/26988  11/1994  WIPO.

*Primary Examiner*—Terry Lee Melius
*Assistant Examiner*—Robert Pezzuto
*Attorney, Agent, or Firm*—Kenyon & Kenyon

[57] ABSTRACT

A method for controlling the operation of a power excavator during a land finishing work is disclosed. In the above method, the bucket, arm and swing unit are controlled in response to output signals from a handling signal input means. Meanwhile, the boom is controlled as follows. That is, when a boom handling signal is output from the handling signal input means, the boom is controlled in response to the boom handling signal. However, when the handling signal input means does not output a boom handling signal, the boom is controlled by a geometrical operation of signals output from the boom, arm and bucket sensors and a land finishing angle for calculating reference boom angle data. The reference boom angle data is control-operated to output an automatic boom control signal, thus controlling the boom in order to move the bucket tip on a land with the land finishing angle in response to an arm handling signal output from the handling signal input means.

5 Claims, 4 Drawing Sheets

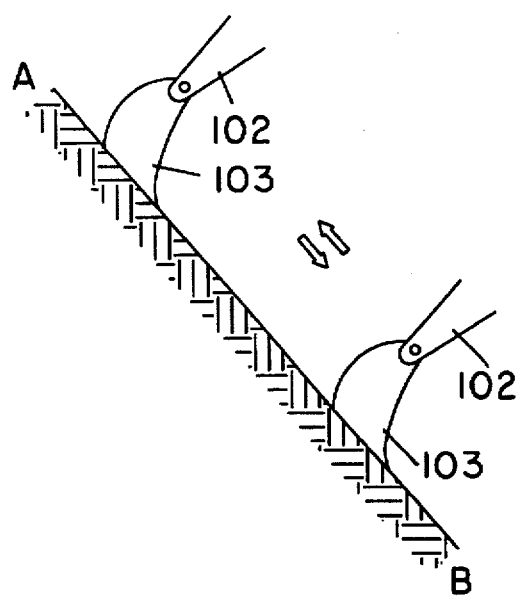
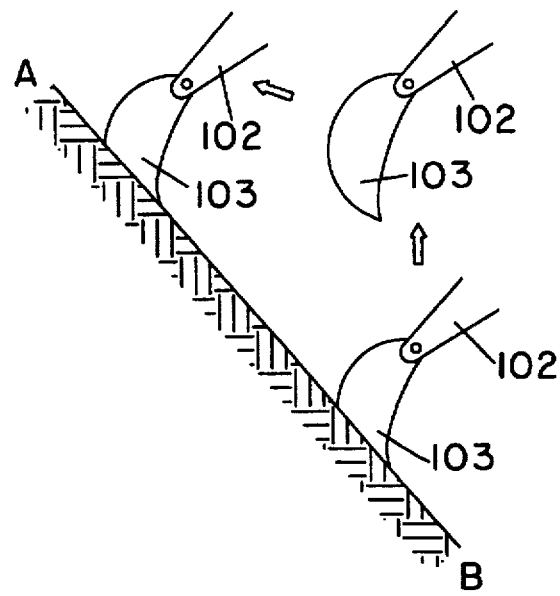
FIG.5A  FIG.5B
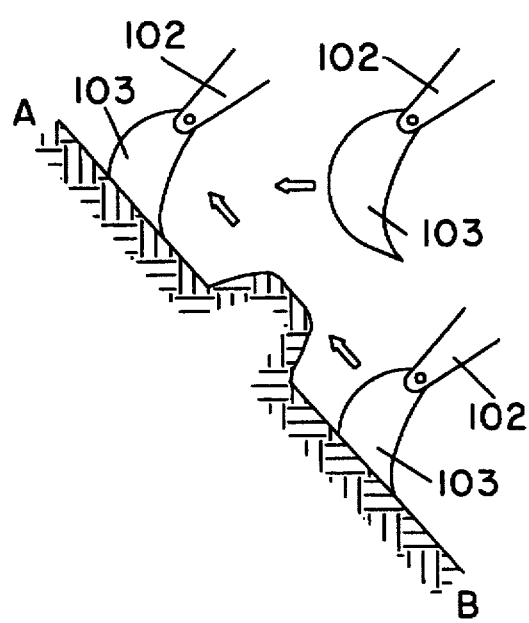
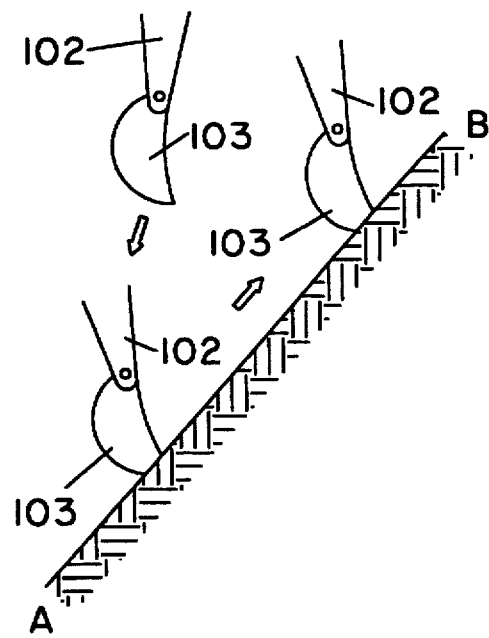
FIG.5C  FIG.5D

METHOD FOR CONTROLLING THE OPERATION OF POWER EXCAVATOR

BACKGROUND OF THE INVENTION

1. Field of the Invention

The present invention relates, in general, to a method for controlling the automatic operation of power excavators and, more particularly, to an improvement in such a control method for improving the work efficiency of the power excavators during a land finishing work, which is an important work performed by the power excavators.

2. Description of the Prior Art

While performing a land finishing work with a power excavator, the working members, such as the boom, arm and bucket, of the power excavator must be individually and/or selectively controlled by an operator. FIG. 1 is a view, schematically showing the configuration and construction of a typical power excavator. As shown in FIG. 1, the operator of the power excavator during a land finishing work must appropriately control the cylinder actuators of the boom 101, arm 102 and bucket 103 and the motor actuators such as the swing and travelling motors. The power excavator during a land finishing work is thus necessarily operated by a highly-skilled operator.

In recent years, electronic controllers are used with the power excavators in order to automatically control the operation of the excavators and to improve the work efficiency of the excavators. The above electronic controller particularly improves the work efficiency of the excavator during a land finishing work. However, the typical control method performed by a controller during a land finishing work has the following problems. That is, the output moving velocities of the working members are limited to fixed velocities, which have no concern with operator's input signals during an automatic land finishing work. In addition, the excavator's operator during an automatic land finishing work must repeatedly operate the switch board in order to generate various input signals, which indicate, for example, selection of the automatic operational mode and an object land finishing angle. Another problem of the typical control method resides in that the operation of the excavator during a land finishing work must be repeatedly intermitted. That is, the operator during a land finishing work must often cancel the existing automatic operational mode, select a manual operational mode and reselect the automatic operational mode with reset of an object land finishing angle, thus becoming fatigued. The above-mentioned operational intermission also reduces work efficiency of the excavator during the land finishing work.

SUMMARY OF THE INVENTION

It is, therefore, an object of the present invention to provide a method for controlling the operation of a power excavator during a land finishing work in which the above problems can be overcome and which is not necessary to change the operational mode or to reset the object land finishing angle thereby releasing the excavator's operator from fatigue during a land finishing work and maintains the output moving velocities of the working members according to the operator's input signals and effectively meets with a change of the working conditions of the land finishing work thus improving work efficiency of the excavator during a land finishing work.

In order to accomplish the above object, the present invention provides an improved method for controlling the operation of a power excavator during a land finishing work, the excavator having a boom, arm, bucket and swing unit, and a plurality of angular displacement sensors, such as a boom, arm and bucket sensors. In the above method, the bucket, arm and swing unit are controlled in response to operator's handling signals output from a handling signal input means. Meanwhile, the boom is controlled in accordance with either one of the following two manners. That is, when a boom handling signal is output from the handling signal input means, the boom is controlled in response to the input boom handling signal. However, when the handling signal input means does not output any signal for controlling the boom, the angular displacement signals from the boom, arm and bucket sensors and a land finishing angle are geometrically operated so as to calculate reference boom angle data. Thereafter, the reference boom angle data is compared with the output boom angle data prior to performing a control operation of the difference between the two angle data thereby generating an automatic boom control signal. The automatic boom control signal is, thereafter, output and controls the boom in order to cause the bucket tip to move on the land with the object land finishing angle in response to an arm handling signal output from the handling signal input means.

BRIEF DESCRIPTION OF THE DRAWINGS

The above and other objects, features and other advantages of the present invention will be more clearly understood from the following detailed description taken in conjunction with the accompanying drawings, in which:

FIGS. 5A and 5D are views, showing examples of the automatic operation of the land finishing work performed by a power excavator controlled by the control method of this invention.

DESCRIPTION OF THE PREFERRED EMBODIMENTS

Figure 2:
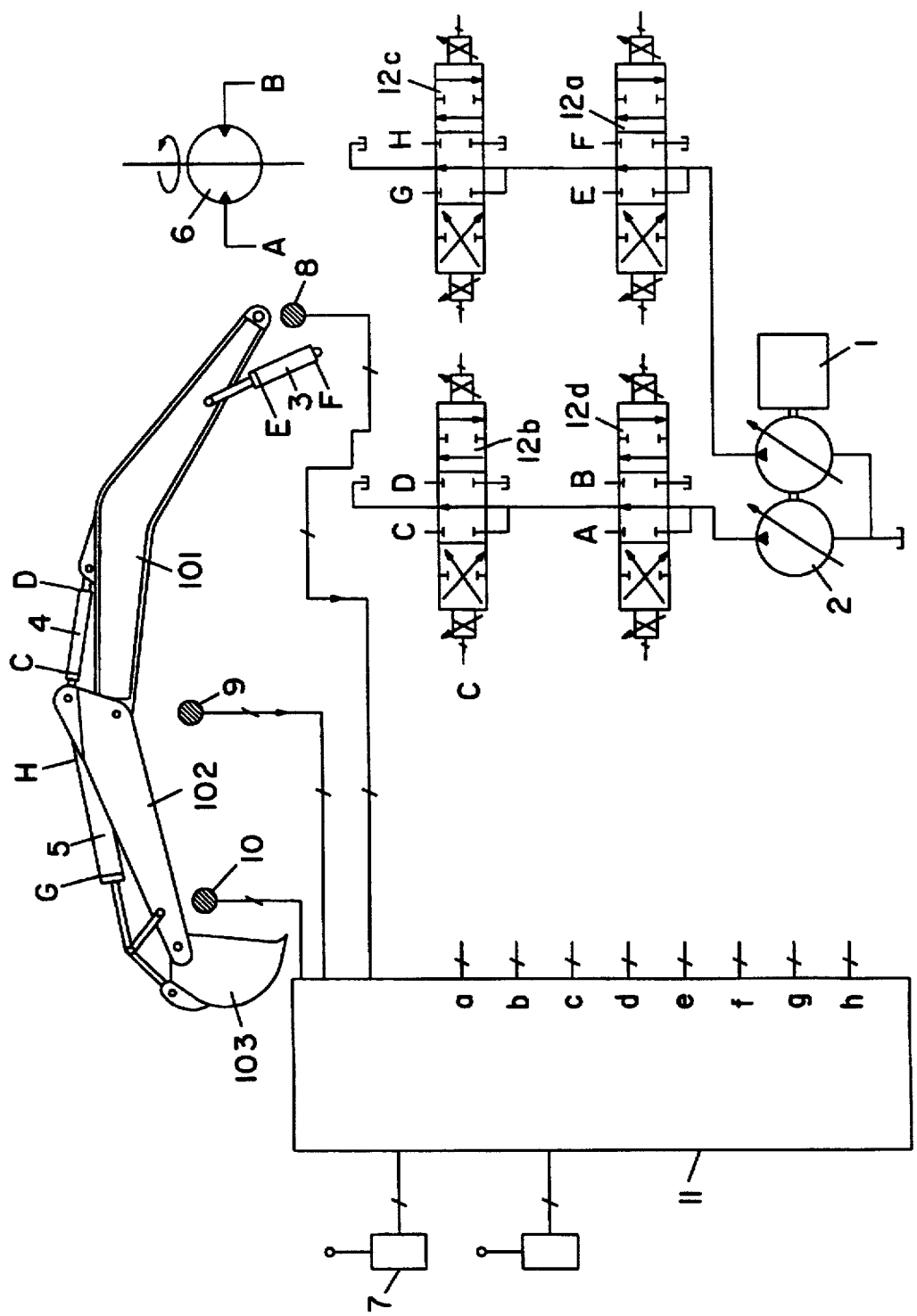
FIG. 2 is an electronic and hydraulic system, which is installed in a power excavator and is controlled by the control method of this invention.

FIG. 2 is an electronic and hydraulic system, which is installed in a power excavator and is controlled by the control method according to the present invention.

As shown in FIG. 2, the system includes an engine 1, which is used as a power source. A plurality of, preferably, two variable hydraulic pumps 2 are coupled to the engine 1 and are operated by the rotational force of the engine 1. The system also includes a plurality of cylinder actuators, such as a boom cylinder 3, arm cylinder 4 and bucket cylinder 5. The above cylinder actuators 3 to 5 are operated by the pressurized oil output from the pumps 2, thus moving the boom 101, arm 102 and bucket 103 of the excavator, respectively.

The system further includes motor actuators, such as a swing motor 6 and a travelling motor. The above swing motor 6, which is installed in the swing unit, controls the turning motion of the turret relative to the lower travelling part of the excavator. The above cylinder and motor actuators 3 to 6 are connected to the pumps 2 through respective oil passages. Mounted to the respective oil passages are directional control valves 12a, 12b, 12c and 12d. The above valves 12a to 12d control the flow direction and flow rate of the pressurized oil, which is output from the pumps 2 and flows to the actuators 3 to 6, thereby controlling the motion of the actuators 3 to 6. In the above system, it is preferable to control the spool strokes of the directional control valves 12a to 12d in response to current control signals and to control the flow direction and flow rate of the pressurized oil for the actuators 3 to 6 in proportion to currents of the control signals. The above object may be achieved by a plurality of proportional control valves (not shown), which are connected to the respective directional control valves 12a to 12d.

In order to detect the angular displacements of the working members (boom 101, arm 102 and bucket 103), a plurality of sensors are provided on the working members. That is, the system has a boom sensor 8, an arm sensor 9 and a bucket sensor 10. The above sensors 8 to 10 detect the angular displacements of the respective working members and output angular displacement signals to a controller 11, which includes a micromethodor. In order to output the operator's handling signals to the controller 11, a handling signal input means 7, including a plurality of control levers and pedals, are provided in the control cap of the turret. Upon receiving both the output signals (handling signals) from the handling signal input means 7 and the output signals (displacement signals) from the sensors 8 to 10, the controller 1 operates the handling and displacement signals prior to outputting current control signals to the directional control valves 12a to 12d. That is, the above controller 11 controls the directional control valves 12a to 12d move the tip of the arm in response to the handling signals, output from the handling signal input means 7, while maintaining the object land finishing angle.

In accordance with the control system of this invention, the bucket 103, arm 102 and swing unit are controlled as follows. That is, the controller 11 operates the handling signals from the handling signal input means 7, and outputs current control signals to the directional control valves associated with the bucket, arm and swing unit. The controller 11 thus controls the spool strokes of the above direction control valves associated with the bucket, arm and swing unit in accordance with the operator's handling signals, which are output from the handling signal input means 7. Meanwhile, the control system of this invention controls the boom 101 as follows. When the handling signal input means 7 outputs an operator's handling signal for manually controlling the motion of the boom 101, the controller 11 outputs a manual boom control signal in order to control the boom 101 in response to the above operator's handling signal. However, when the handling signal input means 7 does not output any signal for controlling the motion of the boom 101, the controller 11 geometrically operates the angular displacement signals output from the boom, arm and bucket sensors 8 to 10. In the above case, the above controller 11 also geometrically operates a land finishing angle, which was set by the controller 11 in response to the operator's handling signals output from the handling signal input means 7. After the above geometric operations of the angular displacement signals and land finishing angle, the controller 11 calculates reference boom angle data and performs a control operation of the difference between the reference boom angle data and the output boom angle data, thus generating an automatic boom control signal, which is output to the directional control valves. The controller 11 thus controls the boom 101 in order to cause the bucket tip to move on the land with the constant land finishing angle in response to an arm handling signal output from the handling signal input means.

Figure 1:
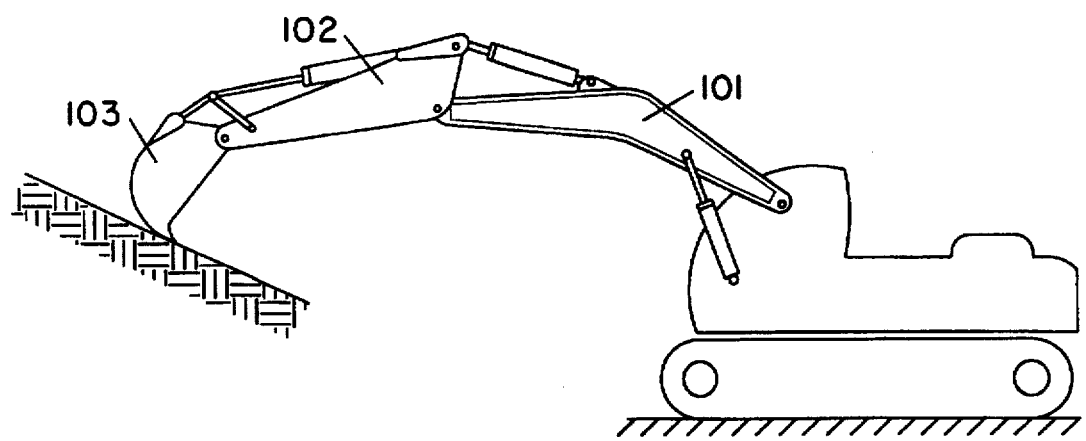
FIG. 1 is a view, showing the configuration and construction of a power excavator.
Figure 4:
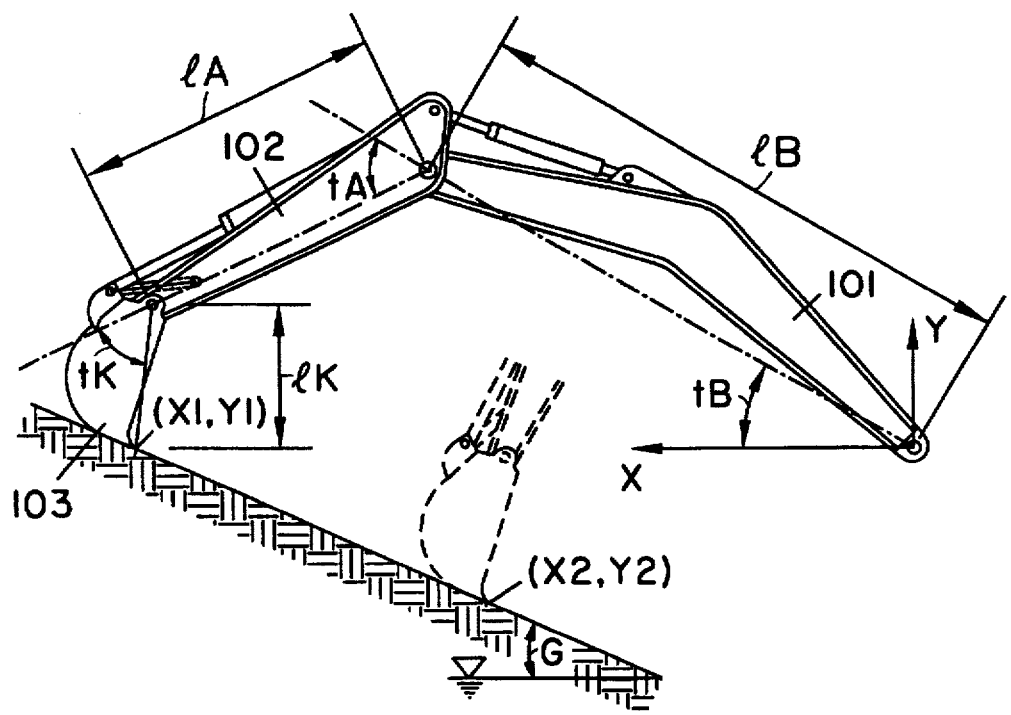
FIG. 4 is a view, showing the method for setting the reference coordinate system of the working members during a land finishing work according to this invention.
Figure 3:
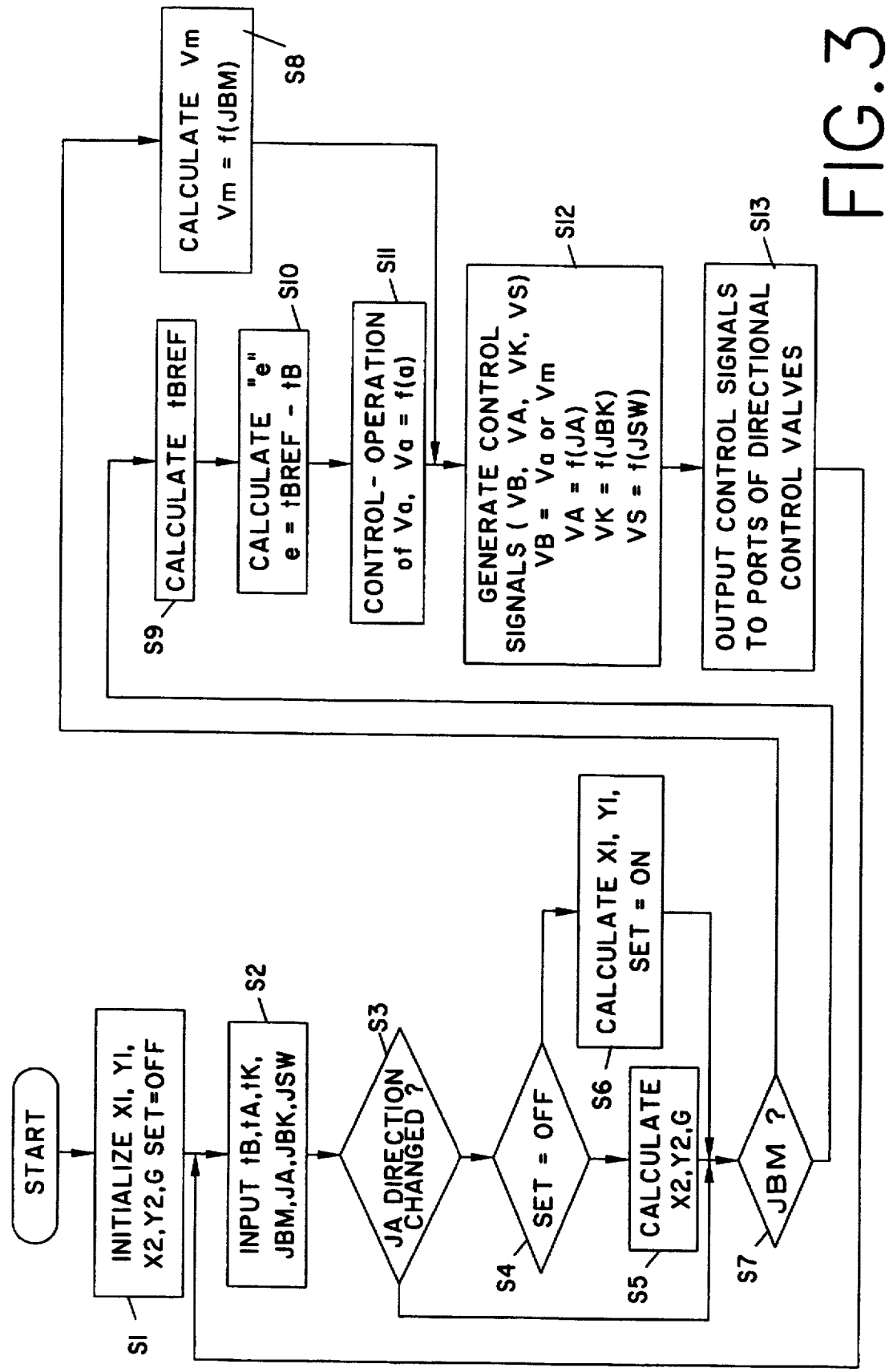
FIG. 3 is a flowchart of the control method according to the invention.

FIG. 3 is a flowchart of the control method according to the present invention. FIG. 4 is a view showing the method for setting the reference coordinate system of the boom 101, arm 102 and bucket 103 according to the present invention.

As represented in the flowchart of FIG. 3, at step 1 the controller 11 initializes the bucket tip's coordinates X1, Y1 and X2, Y2 in the absolute reference coordinate system X-Y. In this case, the above coordinates X1, Y1 and X2, Y2 are variables of the bucket tip positioned on the land finishing start and end points of the land, respectively. At step 1, the controller 11 also initializes an object land finishing angle G. In addition, the controller 11 sets on the flag in order to store the start point coordinate X1, Y1 during an automatic land finishing work of the excavator.

At step 2, the controller 11 receives the boom angle data tB output from the boom sensor 8, the arm angle data tA output from the arm sensor 9, the bucket angle data tK output from the bucket sensor 10 and operator's handling signal data JBM, JA, JBK and JSW output from the handling signal input means 7.

At step 3, the controller 11 checks whether the direction of the input arm handling signal JA has been changed. In the above case, the directional change of the input handling signals applied from the handling signal input means 7 means as follows. For example, in case of an arm handling signal JA, it is checked whether the input arm handling signal JA indicates a conversion of an existing arm-out motion into an arm-in motion or a conversion of an existing arm-in motion into an arm-out motion. In case of a boom handling signal JBM, it is checked whether the input boom handling signal JBM indicates a conversion of an existing boom-up motion into a boom-down motion or a conversion of an existing boom-down motion into a boom-up motion. On the other hand, the directional change of the arm handling signal JA is used as reference data by the controller 11 when checking the starting, stopping or restarting timing of the land finishing work. When at step 3 it is determined that the arm handling signal has not been changed, it means that the existing motion of the arm 102 must be continued, The controller 11 in the above case methodes step 7. However, when at step 3 it is determined that the arm handling signal has been changed, the direction of the arm's motion must be changed. In the above case, the controller 11 methodes step 4.

At step 4, the controller 11 checks whether the flag for storing the start point coordinate X1, Y1 has been set off. When it is determined that the coordinate storing flag has been set on, it means that the start point coordinate X1, Y1 in the reference coordinate system X-Y have been stored in the controller 11. Meanwhile, when it is determined that the coordinate storing flag has been set off, it means that the above coordinate X1, Y1 have not been stored in the controller 11. When at step 4 it is determined that the coordinate storing flag has been set off, the controller 11 methodes step 6. On the contrary, when it is determined that the coordinate storing flag has been set on, the controller 11 methodes step 5.

At step 5, the controller 11 performs a predetermined geometric operation of the boom angle data tB, arm angle data tA and bucket angle data tK, which were applied to the controller 11 at step 2, thus calculating the end point coordinate X2, Y2 in the reference coordinate system X-Y.

After calculating the coordinate X2, Y2, the controller 11 calculates the object land finishing angle G using the above start and end point coordinates X1, Y1 and X2, Y2.

At step 6, the controller 11 performs a predetermined geometric operation of the boom angle data tB, arm angle data tA and bucket angle data tK, which were applied to the controller 11 at step 2, so that the start point coordinate X1, Y1 in the reference coordinate system X-Y has calculated and stored in the controller 11. Thereafter, the controller 11 sets on the coordinate storing flag prior to methoding step 7.

At step 7, the controller 11 checks whether a boom handling signal JBM has been output from the handling signal input means 7. When at step 7 it is determined that a boom handling signal JBM has been output from the handling signal input means 7, it means that operator manually controls the motion of the boom 101 during the land finishing work. In the above case, the controller 11 methodes step 8. Meanwhile, when at step 7 it is determined that a boom handling signal JBM has not been output from the handling signal input means 7, the controller methodes step 9.

At step 8, the controller 11 performs a predetermined operation of the data of the input boom handling signal JBM, and generates a manual boom control signal Vm in order to control the spool stroke of the boom cylinder directional control valve in response to the input boom handling signal JBM. The boom cylinder directional control valve thus controls the flow direction and flow rate of the pressurized oil for the boom cylinder and controls the operation of the boom cylinder in response to the input boom handling signal JBM. After methoding step 8, the controller 11 methodes step 12.

At step 9, the controller 11 performs a predetermined geometric operation of the boom angle data tB, arm angle data tA, bucket angle data tK, which were received in the controller 11 at step 2. At this step, the controller 11 also geometrically operates the land finishing angle G, which was calculated at step 5. As a result of the above geometric operations of the angle data and land finishing angle, the controller 11 calculates reference boom angle data tBref, which is used as reference data for controlling the boom 101 in order to move the bucket tip on the land with the constant land finishing angle in response to an arm handling signal output from the handling signal input means 7. Thereafter, the controller 11 methodes step 10.

At step 10, the controller 11 compares the reference boom angle data tBref of step 9 with the output boom angle data tB of step 2, thus calculating the difference (error data, e=tBref−tB) between the two angle data tBref and tB. After methoding step 10, the controller 11 methodes step 11.

At step 11, the controller 11 performs a predetermined control operation of the above error data "e" of step 10, thus generating an automatic boom control signal Va for automatically control the spool stroke of the boom cylinder directional control valve. The boom cylinder directional control valve thus controls the flow direction and flow rate of the pressurized oil for the boom cylinder. After methoding step 11, the controller 11 methodes step 12.

At step 12, the controller 11 performs an operation of either the manual boom control signal Vm of step 8 or the automatic boom control signal Va of step 11, thus generating a current control signal. The above current control signal in turn is output to the boom cylinder directional control valve, thereby controlling the spool stroke of the boom cylinder directional control valve. The controller 11 at step 12 also operates the signal data JBK, JA, JSW, which were output from the handling signal input means 7 at step 2, thus generating current control signals for controlling the spool strokes of the directional control valves associated with the bucket 103, arm 102 and swing unit. Thereafter, the controller 11 methodes step 13.

At step 13, the controller 11 outputs the current control signals of step 12 to the signal input ports of the respective directional control valves. Thereafter, the controller 11 returns to step 2 in order to repeat the above-mentioned method.

FIGS. 5A and 5B are views showing examples of the automatic operation of the land finishing work performed by a power excavator, which is controlled in accordance with the control method of this invention.

In case of the operation shown in FIG. 5A, the operator of the excavator handles the handling signal input means 7 and controls the working members, that is, the boom 101, arm 102 and bucket 103, in order to position the bucket tip on the start point A of the land finishing work. Thereafter, the operator controls the working members 101, 102 and 103 in order to move the bucket tip to the end point B of the land finishing work. While the bucket tip moves from the point A to the point B as described above, the bucket 103 performs one cycle of the land finishing work. In order to position the bucket tip on the start point A of FIG. 5A, the arm 102 is ontrolled to be rotated out. The arm 102 in the above position in turn is rotated in, thus moving to the end point. The controller 11 in the above state automatically stores he coordinate X1, Y1 of the start point A in the same manner as described for the flowchart of FIG. 3. When the bucket tip of the excavator reaches the point B and one land finishing cycle is finished, the operator inputs an arm-in motion signal irrespective of the existing boom motion, so that the above-mentioned motions of the working members are repeated until the land finishing work is finished. In the above state, the controller 11 automatically stores the coordinates X1, Y1 and X2, Y2 of the start and end points A and B in its memory, and calculates the object land finishing angle G using the above coordinates X1, Y1 and X2, Y2 in the same manner as described for by the flowchart of FIG. 3. The controller 11 thus controls the motion of the working members in accordance with the control method as described above for the flowchart of FIG. 3, even when the operator does not handle the handling signal input means associated with the boom. At the end point B, the arm 102 is rotated out. Thereafter, the operator automatically operates the working members with the constant land finishing angle between the start and end points A and B until the working members completely finish the land finishing work. Of course, the operator while performing the automatic land finishing work may selectively control the bucket motion in order to effectively meet with a partial change of the land surface conditions.

FIG. 5B shows that the bucket 103 is separated from the land surface at the end point B, and returns from to the start point A by the operator, who controls the boom 101 and arm 102 after finishing one land finishing cycle from the start point A to the end point B. The above operation shown in FIG. 5B is effectively used for finishing, for example, a slope. In the above operation, the land finishing angle of a previous cycle is stored in the controller 11 as described for the flowchart of FIG. 3. Therefore, if the direction of the arm handling signal input by the operator is not changed during the above land finishing work, the working members automatically repeat the land finishing work with the constant land finishing angle even when the operator exclusively controls the arm 102 after returning the bucket 103 to the start point A.

In a known control method, the automatic operation for performing the above land finishing work of FIG. 5B must be intermittently stopped at the end point B prior to moving the bucket 103 to the start point A. At the start point A, the operator reselects the automatic operational mode prior to input of object land finishing angle.

The automatic operation of FIG. 5B may be understood from the description of FIG. 5A. That is, the operator handles the handling signal input means 7 in order to generate handling signals, for example, an arm-out signal, thereby positioning the bucket tip on the start point A of FIG. 5A. After positioning the bucket tip on the point A, the operator individually or selectively controls the working members, that is, the boom 101, arm 102 and bucket 103, in order to separate the bucket tip from the land surface and to move the bucket tip to the end point B while maintaining the arm-in motion without necessity of moving the bucket tip on the land surface. During the above operation, the object land finishing angle of the automatic land finishing work is automatically set in the controller 11. The arm tip in the above state is automatically moved to a position with the object land finishing angle by inputting an arm-out signal.

FIG. 5C shows an operation for controlling the working members when there is an obstacle on the land surface during a land finishing work. That is, the operation of FIG. 5C is equal to partial composition of the operations of FIGS. 5A and 5B. In the operation of FIG. 5C, the operator controls the arm 102 in order to automatically perform the land finishing work from the point B. When the bucket tip during the above automatic operation reaches the point C of FIG. 5C, the operator controls the boom 101 while maintaining the existing arm-out motion thus positioning the bucket tip on the point D of FIG. 5C. When the bucket tip is positioned on the point D, the operator controls the arm 102 in order to continue the automatic land finishing work. In the known control method, the working members of the excavator are automatically controlled while the bucket tip moves from the point B to the point C. When the bucket tip reaches the point C, the automatic operation of the working members is stopped by the operator. Thereafter, the operator handles the handling signal input means in order to move the bucket tip from the point C to the point D. After positioning the bucket tip on the point D, the operator reselects the automatic operational mode and inputs the object land finishing angle in order to restart the automatic land finishing work.

FIG. 5D shows a change of the working conditions from the conditions with the land finishing angle of FIGS. 5A to 5C to the conditions with the land finishing angle of FIG. 5D. In the operation of FIG. 5D, the operator primarily controls the working members in order to move the bucket tip from the point A of FIG. 5C to the point A of FIG. 5D. Thereafter, the working members are automatically controlled in the same manner as described for the operations of FIGS. 5A to 5C, so that the excavator simply performs the automatic land finishing work while appropriately meeting with the change of the working conditions. In the known control method, the operator must stop the automatic operational mode when the bucket tip reaches the point A of FIG. 5C. Thereafter, the working members are controlled by the operator in order to move the bucket tip from the point A of FIG. 5C to the point A of FIG. 5D. After positioning the bucket tip on the point A of FIG. 5D, the operator reselects the automatic operational mode and inputs the object land finishing angle in order to restart the automatic operation for accomplishing the land finishing work.

As described above, the present invention provides an improved method for automatically controlling the operation of a power excavator during a land finishing work. In the control method of this invention, it is not necessary to change the operational mode or to reset the object land finishing angle, so that the method of this invention releases the excavator's operator from fatigue during a land finishing work. The above method also maintains the output moving velocities of the working members, such as the boom, arm and bucket, according to the handling signals output from the handling signal input means and effectively meets with a change of the working conditions of the land finishing work, thus improving work efficiency of the excavator during a land finishing work.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for automatically controlling the operation of a working implement of a power excavator during a land finishing work, said working implement comprising a boom, an arm, a bucket and a swing unit, and said power excavator further comprising handling signal input means handled by an operator; a plurality of sensing means for detecting angular displacement of said boom, arm and bucket; and a controller for controlling said boom, arm, bucket and swing unit by a predetermined operation based on handling signals output from said handling signal input means and positional signals output from said sensing means; wherein said method comprises the following steps of:

detecting a change in a motional direction of said arm, said change being made by an arm handling signal output from said handling signal input means;

computing an object operational angle of said bucket by performing a predetermined geometrical calculation based on said positional signals detected at a plurality of points where the motional direction of said arm is changed;

controlling said boom in accordance with either one of the following manners, wherein:
    when an operator controls said boom, said boom is controlled in response to a boom handling signal output from said handling signal input means; and
    when the operator controls said arm and does not control said boom, said boom is automatically controlled so that an end of said bucket moves at said object operational angle in response to said arm handling signal output from said handling signal input means.

2. A method for controlling the operation of a power excavator during a land finishing work, the excavator having handling signal input means, a boom, an arm, a bucket and a swing unit, and a plurality of angular displacement sensors comprising a boom sensor, an arm sensor and a bucket sensor, the method comprising the steps of:

a) initializing start and end point coordinates of a bucket tip, positioned on land finishing start and end points, and initializing an object land finishing angle, and setting on a flag in order to store the start point coordinate during an automatic land finishing work;

b) receiving boom angle data from the boom sensor, arm angle data from the arm sensor, bucket angle data from the bucket sensor and operator's handling signal data output from the handling signal input means, said operator's handling signal data comprising arm handling signal data, bucket handling signal data and swing unit handling signal data;

c) checking whether the direction of said arm handling signal of step (b) has been changed;

d) when said arm handling signal has been changed, checking whether said flag has been set off;

e) when said flag has been set on, performing a predetermined geometric operation of the boom angle data, arm angle data and bucket angle data, thus calculating the end point coordinate of the bucket tip prior to calculating the object land finishing angle using said start and end point coordinates;

f) when said flag has been set off, performing a predetermined geometric operation of the boom angle data, arm angle data and bucket angle data, thus calculating the end point coordinate of the bucket tip prior to setting on the flag;

g) checking whether said boom handling signal has been output from said handling signal input means;

h) when said boom handling signal has been output from the handling signal input means, performing a predetermined operation of the data of the boom handling signal in order to generate a manual boom control signal for controlling the boom in response to said boom handling signal;

i) when said boom handling signal has not been output from the handling signal input means, performing a predetermined geometric operation of the boom angle data, arm angle data, bucket angle data and land finishing angle, thus calculating reference boom angle data used as reference data for controlling the boom in order to move the bucket tip on the land with the land finishing angle in response to said arm handling signal output from said handling signal input means;

j) comparing said reference boom angle data with the boom angle data, thus calculating a difference (error data) between the two angle data;

k) performing a predetermined control operation of said error data, thus generating an automatic boom control signal;

l) performing an operation of either said manual control signal of step (h) or said automatic control signal of step (k) in order to generate a current control signal for the boom, and performing an operation of the arm handling signal data, bucket handling signal data and swing unit handling signal data of step (b) in order to generate current control signals for the arm, bucket and swing unit, and outputting said current control signals to directional control valves associated with the boom, bucket, arm and swing unit; and m) returning to step (b) in order to repeat steps (b) to (l).

3. The method according to claim 1, wherein operational velocity of said working implement is automatically adjusted based on said handling signals output from said handling signal input means.

4. A control system for automatically controlling a working implement of a power excavator, said working implement including a boom, an arm, a bucket and a swing unit, and said power excavator further comprising handling signal input means handled by an operator and a plurality of sensing means for detecting angular displacement of said boom, arm and bucket, wherein said control system comprises:

means for detecting a change in a motional direction of said arm, said change being made by an arm handling signal output from said handling signal input means;

means for computing an object operational angle of said bucket by performing a predetermined geometrical calculation based on said positional signals detected at a plurality of points where the motional direction of said arm is changed; and means for controlling said boom in accordance with either one of the following manners by a predetermined operation based on handling signals output from said handling signal input means and positional signals output from said sensing means, wherein:

when an operator controls said boom, said boom is controlled in response to a boom handling signal output from said handling signal input means;

when the operator controls said arm and does not control said boom, said boom is controlled so that an end of said bucket moves at said object operational angle in response to said arm handling signal output from said handling signal input means.

5. The control system according to claim 4 further comprising means for controlling operational velocity of said working implement, wherein said operational velocity controlling means automatically adjusts said operational velocity of said working implement based on said handling signals output from said handling signal input means.

* * * * *